(No Model.)
M. N. WARREN.
VEHICLE WHEEL.
No. 267,622. Patented Nov. 14, 1882.
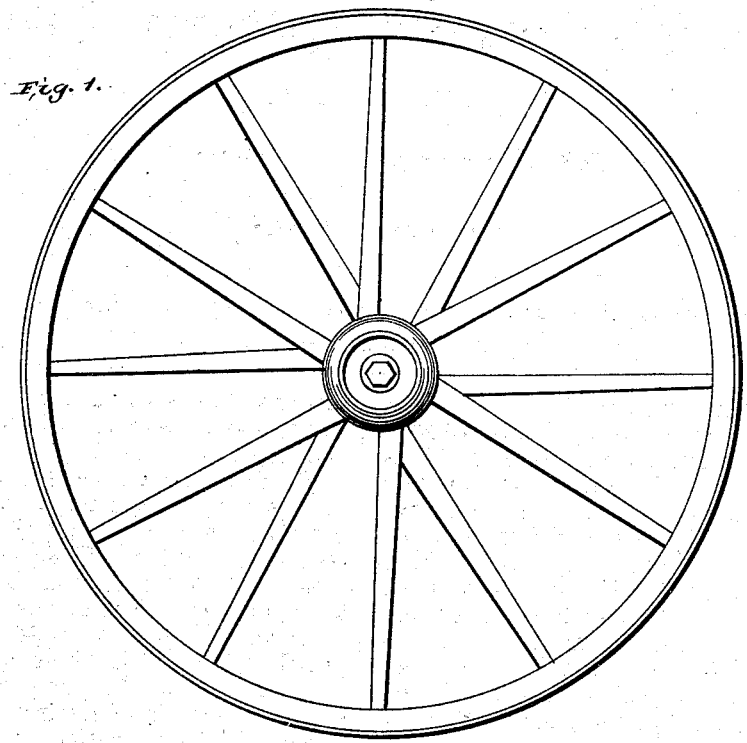
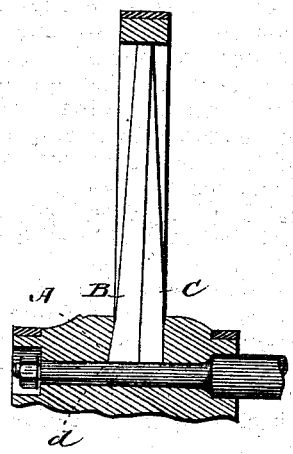
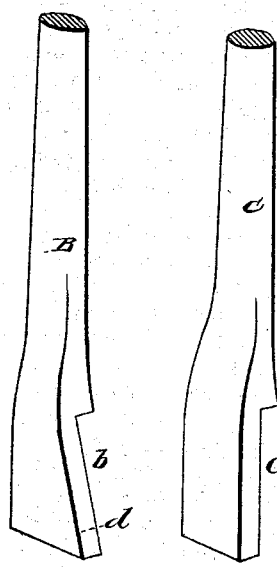
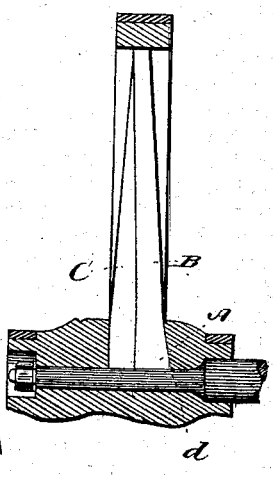
WITNESSES:
INVENTOR.
Moses N Warren
N. W. Fitzgerald & Co.
ATTORNEYS.

UNITED STATES PATENT OFFICE.

MOSES N. WARREN, OF CRESTON, IOWA.

VEHICLE-WHEEL.

SPECIFICATION forming part of Letters Patent No. 267,622, dated November 14, 1882.

Application filed April 15, 1882. (No model.)

*To all whom it may concern:*

Be it known that I, MOSES N. WARREN, a citizen of the United States, residing at Creston, in the county of Union and State of Iowa, have invented certain new and useful Improvements in Vehicle-Wheels; and I do hereby declare the following to be a full, clear, and exact description of the invention, such as will enable others skilled in the art to which it appertains to make and use the same.

My invention relates to certain new and useful improvements in vehicle-wheels, and more particularly to improvements upon the patent of Charles F. Carman, numbered 90,993, granted June 8, 1869, in which case two spokes are arranged in one wide mortise in the hub, with the spoke-braces all on the inside and the perpendicular spokes on the outside. The above-described construction has been found objectionable for the reason that the wheel was not equally braced, and to overcome this defect while making a stronger and lighter wheel is the object of my invention; and to this end the invention consists in novel features of construction, whereby I am enabled to have an equal inclination of both spokes in the center of the felly, and the spoke-braces alternate each other, first to the right and then to the left, the mortise in the hub for the two spokes corresponding to their mutual inclination, all as will be hereinafter fully described, and set forth in the claims hereto annexed.

Referring to the accompanying drawings, Figure 1 represents a side elevation of a wheel constructed according to my improvement; Fig. 2, a sectional view showing the connections of one pair of spokes, also the spokes attached; Fig. 3, detached view of two spokes as constructed to fit said mortise; Fig. 4, a sectional view showing the next two or alternating spokes reversed with reference to the two shown in Fig. 2.

Wide mortises are made in the hub, as shown in Figs. 2 and 4, one end of each mortise being undercut, as at A, and the spokes B C arranged in pairs and having inclined tenons *b c*, as shown in Fig. 3, so as to meet in the center of the felly. The tenons *b* of the spokes B are dovetailed on one side of the spoke B, (which is termed the "bracing-spoke,") is first placed in the mortise, and the perpedicular spoke C driven in afterward, thus keeping the spoke B tightly in position. The next succeeding pair of spokes B C are arranged reversely to the pair, as shown in Fig. 4, and so on throughout the series, so that the bracing-spokes B alternate each other, first on the left and then on the right. The mortises will be cut in accordance with the mutual inclination of the the spokes and the wheel equally braced on both sides, and in consequence thereof a stronger and lighter wheel is produced.

Having thus fully described my invention, what I claim as new, and desire to secure by Letters Patent, is—

The combination of the wheel-hub having a series of mortises, each adapted to receive a pair of spokes, B C, the dovetailed and bracing spokes B alternating each other, first on the left and then on the right, as shown, whereby the wheel is equally braced on both sides, as specified.

In testimony whereof I affix my signature in presence of two witnesses.

MOSES N. WARREN.

Witnesses:
GEO. P. WILSON,
W. J. LOCKE.